Dec. 8, 1953　　　　E. C. CLEMENT　　　　2,661,707
CANDY SLICING MACHINE
Filed Feb. 17, 1949　　　　　　　　　　　　　12 Sheets-Sheet 1

Inventor:
Ernest C. Clement
By: Zabel and Fitzhaugh
Attys

Dec. 8, 1953  E. C. CLEMENT  2,661,707
CANDY SLICING MACHINE
Filed Feb. 17, 1949  12 Sheets-Sheet 4

Inventor:
Ernest C. Clement
By Zabel and Fitzhugh
Attys

Dec. 8, 1953 E. C. CLEMENT 2,661,707
CANDY SLICING MACHINE
Filed Feb. 17, 1949 12 Sheets-Sheet 6

Inventor:
Ernest C. Clement
By: Zabel and Gritzbaugh

Dec. 8, 1953   E. C. CLEMENT   2,661,707
CANDY SLICING MACHINE
Filed Feb. 17, 1949   12 Sheets-Sheet 7
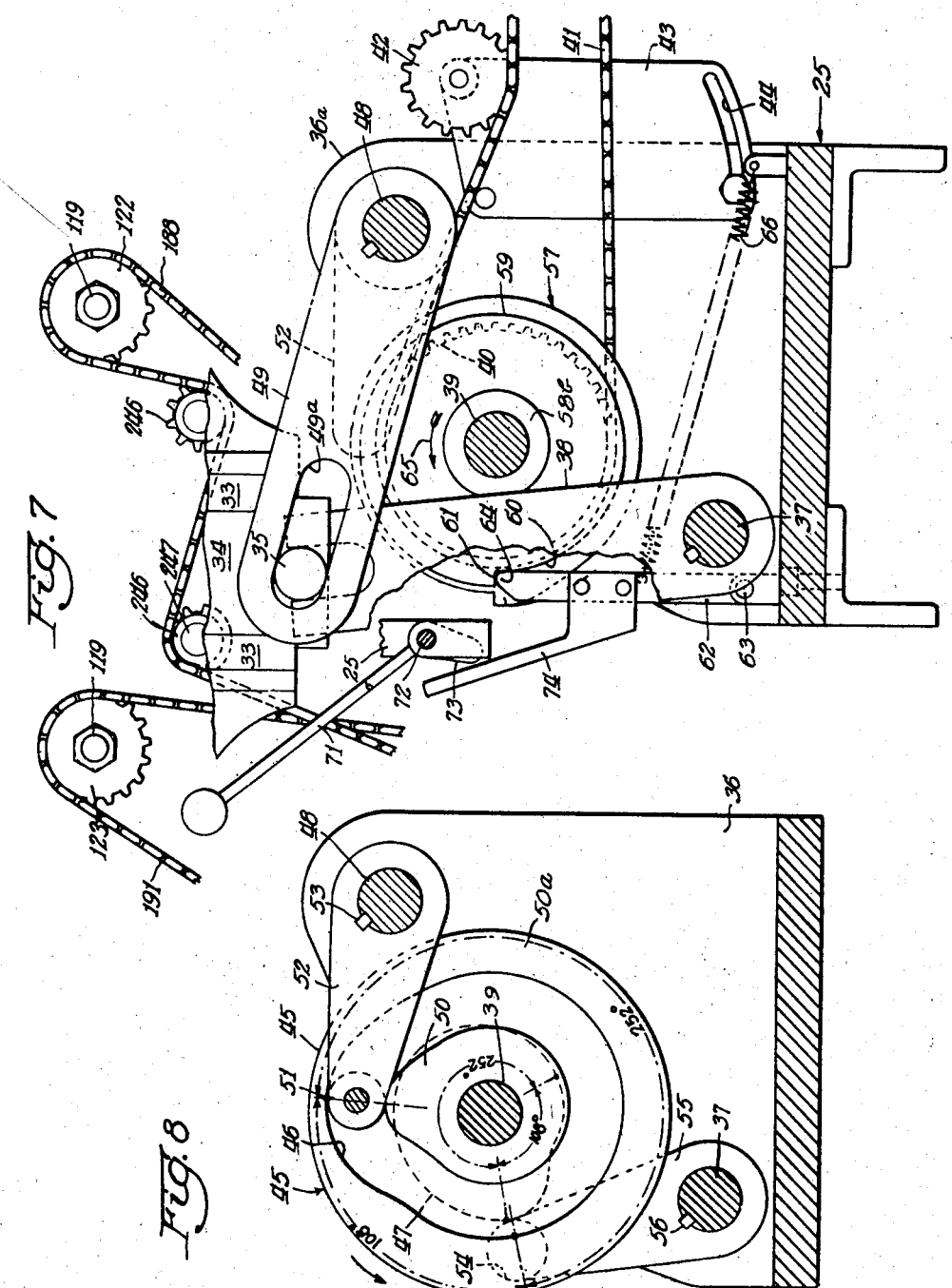
Inventor:
Ernest C. Clement
By: Zabel and Fitzbaugh
Attys Dec. 8, 1953 E. C. CLEMENT 2,661,707
CANDY SLICING MACHINE
Filed Feb. 17, 1949 12 Sheets-Sheet 8

Inventor:
Ernest C. Clement

Dec. 8, 1953     E. C. CLEMENT     2,661,707
CANDY SLICING MACHINE
Filed Feb. 17, 1949     12 Sheets-Sheet 11

Inventor:
Ernest C. Clement
By: Zabel and Gritzbaugh
Attys.

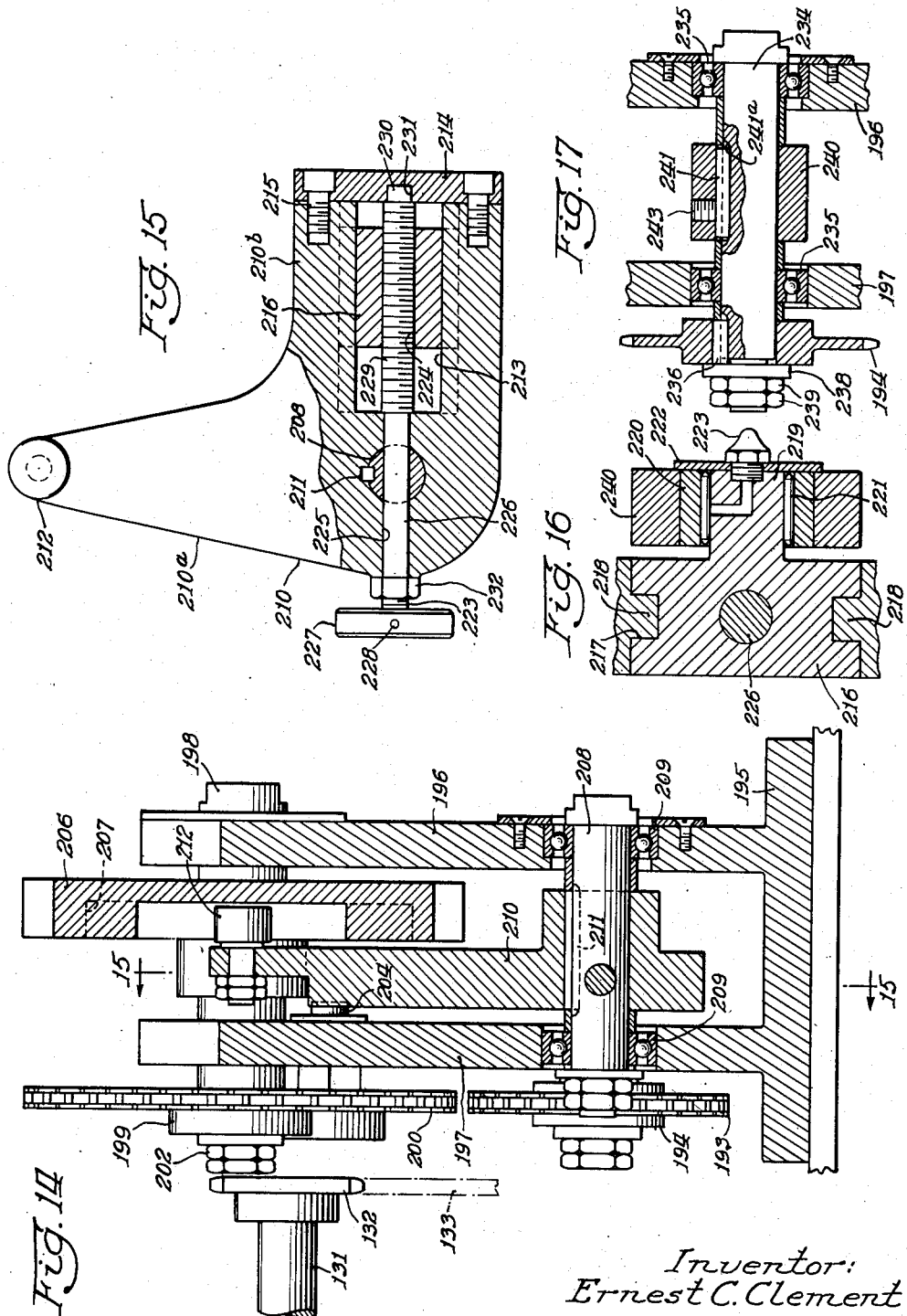

Patented Dec. 8, 1953

2,661,707

UNITED STATES PATENT OFFICE 2,661,707

CANDY SLICING MACHINE

Ernest C. Clement, Chicago, Ill., assignor to Mars, Incorporated, Chicago, Ill., a corporation of Delaware Application February 17, 1949, Serial No. 76,877

4 Claims. (Cl. 107—21)

The present invention is concerned with the manufacture of candy bars and relates primarily to the slicing of strips of candy into bar sizes or lengths. The invention contemplates that the candy dough is first prepared and thoroughly mixed in one or more batch mixers, or the like, and this dough is spread evenly in the form of a sheet onto a continuously moving table or belt. This sheet of candy may comprise numerous layers built up in the form of a unitary sheet that is fed at a uniform rate into a slitting device that slits the sheet into elongated strips or ribbons. These strips in turn are fed into the slicer forming the subject matter of the present invention. A more complete description of this complete operation may be found in the copending application of Robert F. Morrison, Serial No. 762,145, filed July 19, 1947, now U. S. Patent No. 2,612,852, dated October 7, 1952.

An object of the present invention is to provide relatively simple equipment that effectively slices strips or ribbons of candy into bars of uniform lengths. It is intended that this be performed as a continuous operation without the necessity of the human hand touching the candy. It is further intended to provide a slicer that comprises a minimum number of parts and one where the requirement for maintenance is reduced to a minimum. The candy bars cut by the present device are intended to have ends that are straight and are at right angles to the lower and upper faces of the bars as well as with respect to the sides of the bars so that the resulting bar has neither been defaced nor distorted by the slicing operation. In order to prevent distortion of the candy bars, there are certain conditions and requirements that must be met, all of which are satisfied in the device forming the subject matter of the present invention.

The operation of the present slicer contemplates that the endless or elongated strips or ribbons of candy are fed continuously and at a uniform rate of speed onto a slicing platform. A reciprocating slicer knife is brought into engagement with the moving candy strips and is passed through the candy so as to cut off bar lengths which are then moved along away from the knives after the cutting operation has been completed. At all times after the knife has been brought into engagement with the candy and throughout the entire cutting operation the candy strips and the knife must travel at the same rate of speed, for otherwise distortion in the shape of the candy will result. Just as soon as the knife has completed its cutting stroke and a candy bar has been severed from the ribbon or strip, the knife, while still travelling with the strip of candy is raised to a position above and out of the path of the candy strip, and then the knife is moved counter to the direction of the movement of the candy strip to a position where the next cut is to be made. The knife is then again lowered onto the candy strip and the operation is repeated.

At the moment the candy bar has been severed from the candy strip passing under the knife, it is important that this bar be rapidly moved away from the slicer knife so as to be out of the way of the knife while the latter is being raised. This should be done in order to prevent the candy bar from rising with the knife and becoming distorted, or even perhaps clogging the slicer to require stopping of the continuous operation. This spacing of the cut bars is also important in order to prevent them from becoming stuck or welded together again. It is equally important, however, that the bar portion of the candy strip travel at the same speed as the strip and the knife during the period the knife is passing through the candy in order to preserve the proper shape of the bar.

Thus it is a requirement of the conveyor moving the candy through the slicer to convey the candy at a constant speed before and during the slicing operation, but just the moment a candy bar is severed from the candy strip the conveyor is required momentarily to accelerate just the severed bar to effect the instant spacing of the bar from the slicer knife. During this momentary period the movement of the candy strip on the feed side of the slicer knife is continued without interruption at the original constant speed so that the leading edge of the candy strip is always conveyed forward and almost immediately engages that portion of the conveyor (which may be called the discharge portion) that has momentarily been accelerated. For this reason it is important that the period of accelerated speed of this discharge portion of the conveyor be very brief and hence limited only to that time needed to effect the proper spacing of the cut-off bar from the knife directly behind it. The discharge conveyor then quickly returns to the speed of the remaining portion of the conveyor to give proper support to the forward or leading edge of the candy strip following the cut-off bar.

Another object of the invention is to provide a slicing machine of the character described wherein by simple adjustments the length of the units cut may be changed. This feature enables the machine to be used in the production of candy bars, etc. of various sizes and shapes.

All of this is accomplished with the slicing machine forming the subject matter of the present invention. Thus the foregoing constitute certain objects and advantages of the present invention, others of which will become apparent from the following description and from the drawings, in which Fig. 1 is a side elevational view of the slicer forming the subject matter of the present invention, the frame being broken away to expose the slicer operating mechanism;

Fig. 7 is a side elevational view of a fragment of the device, the view being taken along the line 7—7 of Fig. 3;

Fig. 8 is a transverse sectional view taken along the line 8—8 of Fig. 3;

Fig. 14 is a vertical sectional view taken through the intermittent drive control unit forming part of the drive assembly, the view being taken along the line 14—14 of Fig. 11;

Fig. 15 is an enlarged, vertical sectional view taken through a fragment only of the intermittent drive control unit, the view being taken along the line 15—15 of Fig. 14;

Figure 11:
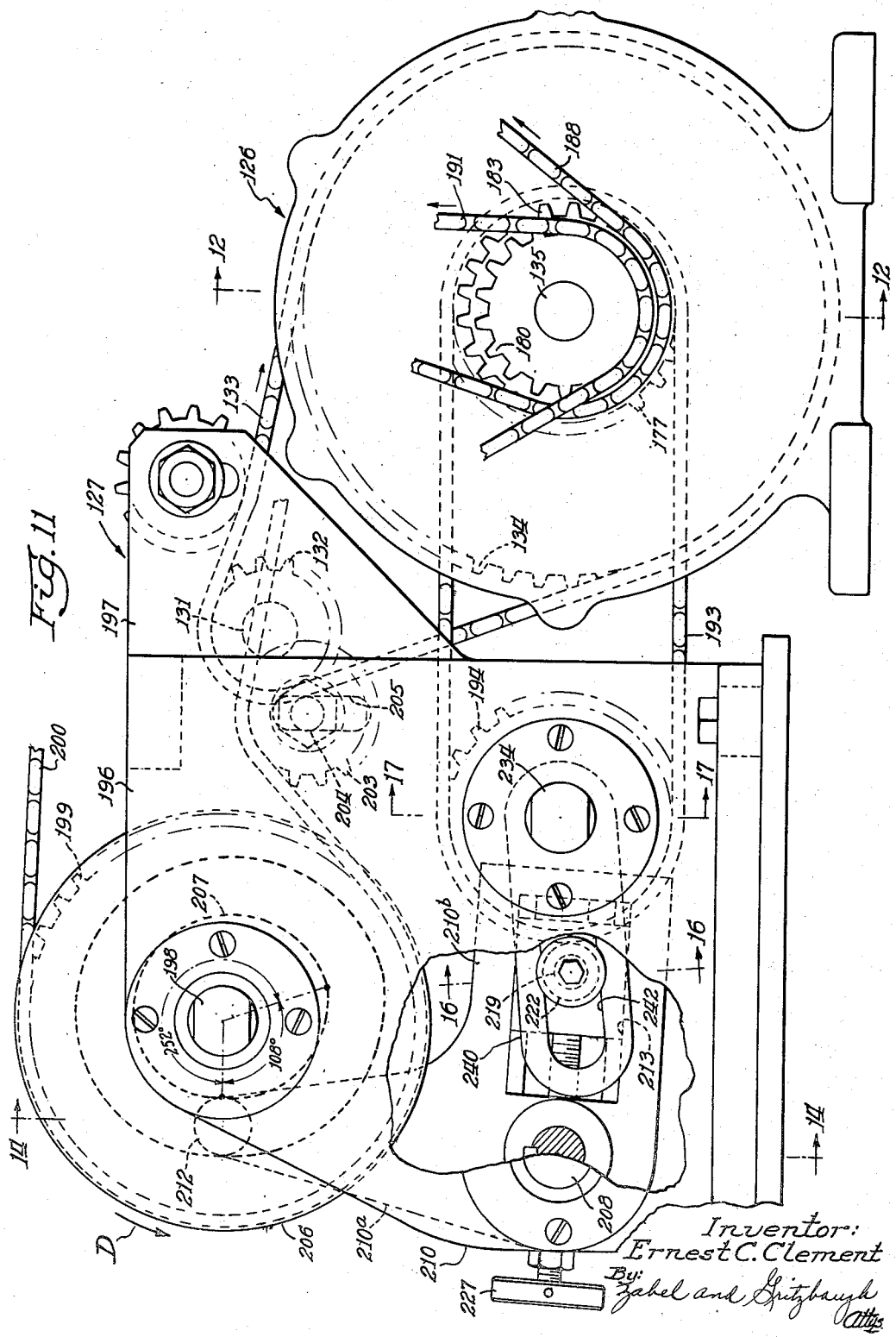
Fig. 11 is an enlarged, side elevational view of the drive assembly that powers the conveyor units that move the candy through the slicer.

Fig. 16 is an enlarged, vertical, fragmentary sectional view through the intermittent drive control unit, the view being taken along the line 16—16 of Fig. 11 with the side walls of the control unit being eliminated for purpose of clarity; and Fig. 17 is an enlarged, vertical, fragmentary sectional view taken through the intermittent drive control unit, the view being taken along the line 17—17 of Fig. 11.

The present specification includes subject matter that is disclosed and claimed in the co-pending prior application of Robert F. Morrison and Ernest C. Clement entitled "Candy Slicing Machines," Serial No. 762,426, filed July 21, 1947, now U. S. Patent No. 2,620,753, dated December 9, 1952.

For purposes of illustration a specific embodiment of the present invention has been selected, it being recognized however that numerous modifications will occur to the man skilled in the art, and it is intended that such modifications may be made without departing from the spirit and intended scope of the invention.

The slicing equipment known as a slicer described herein is ideally suited for use in connection with the making of candy bars consisting of a wide variation of ingredients put together in accordance with many different formulae, such for example as caramel, toffee, marshmallow and nougat, or a combination of these materials. Specifically speaking, the nougat is a batter-like mix made of aerated egg white and a syrup of sugar, salt, water and corn syrup; and after thoroughly beating this mix to provide additional aeration, vegetable oil, malted milk and cocoa are added and all are thoroughly mixed together. This mix or dough known as nougat may then be introduced through spreading equipment onto a moving conveyor. This conveyor moves this nougat through certain stations, if desired, where caramel and nuts or the like may be spread thereon and this resulting sheet of candy is then first slit lengthwise into strips which are then alternately conveyed to lower and upper levels by means of a device known as a separator. This separator is indicated in broken lines in Fig. 1, the upper level being indicated at 23a and the lower level at 23b. The strips are then deposited by the separator onto the bar slicer that forms the subject matter of the present invention. After the bars have been sliced into lengths they are conveyed onto a suitable conveyor device having upper and lower levels 24a and 24b that then transfer the bars back to a common level where the bars are then deposited upon a conveyor belt that moves them into a chocolate enrober.

Figure 1:
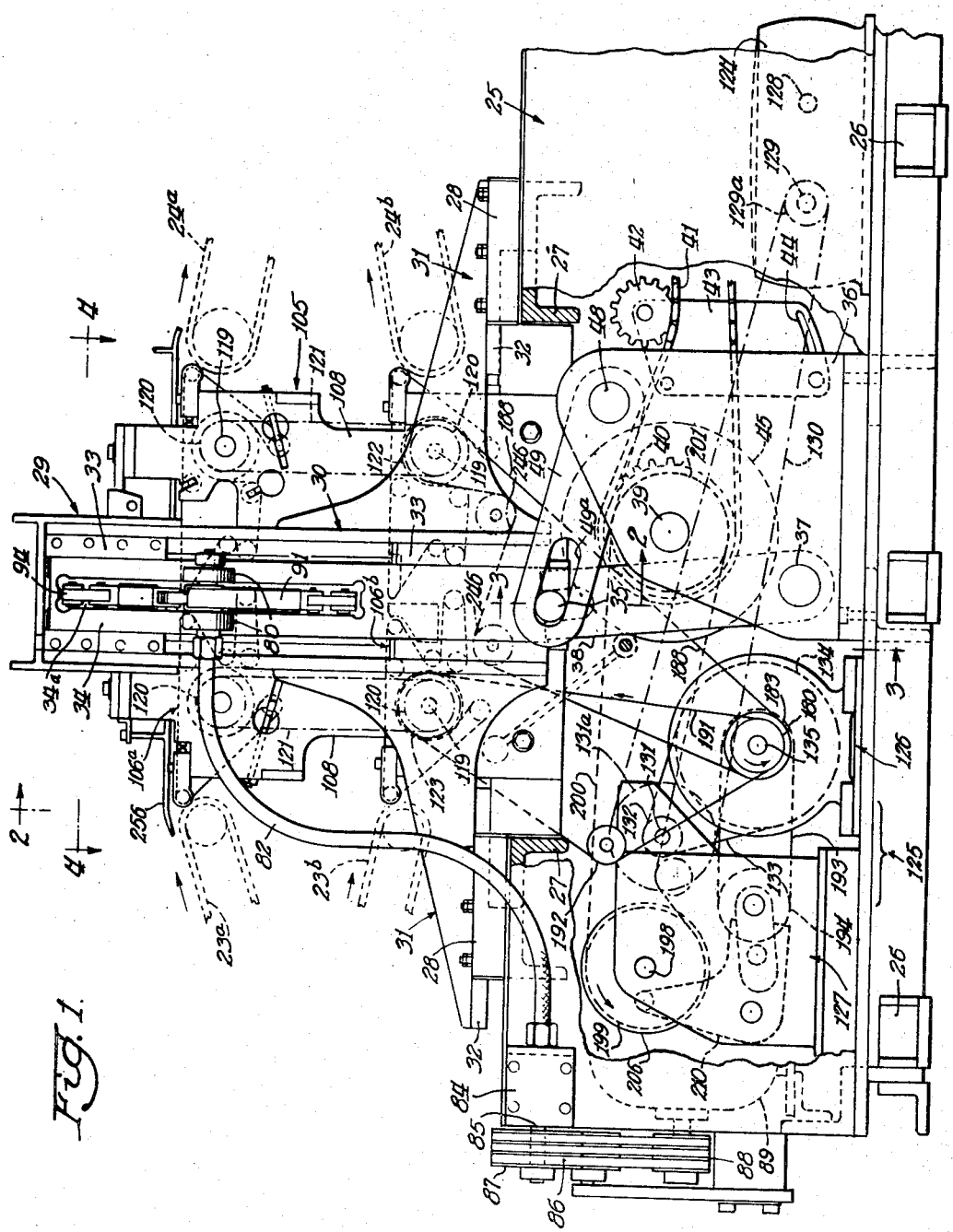

Referring to the drawings and particularly to Fig. 1, the slicer comprises generally a frame indicated at 25 that is supported on a plurality of feet 26. This frame includes sides, ends and numerous cross braces, most of which have been omitted for purposes of clarity and only those framing members which are deemed to be important for a full disclosure of the invention are shown. This frame 25 includes a pair of cross braces 27 (Fig. 1) that are spaced longitudinally along the frame and are welded or otherwise secured to the sides of the frame. Supported on these cross braces 27 are spaced bearing blocks 28, there being one of such bearing blocks at each end of each cross brace 27. Mounted on these bearing blocks 28 is an inverted U-shape frame generally indicated at 29 (Fig. 2) that is provided with spaced vertically disposed legs, one of which is shown at 30 in Fig. 1. The bottom of each leg 30 is provided with a foot portion 31 that provides a forwardly and rearwardly projecting bearing plate 32, each of which is mounted for sliding movement on the corresponding bearing block 28. Thus the U-shape frame 29 is adapted to slide back and forth on the bearing blocks 28 in a direction from left to right and return as shown in Fig. 1.

Figure 4:
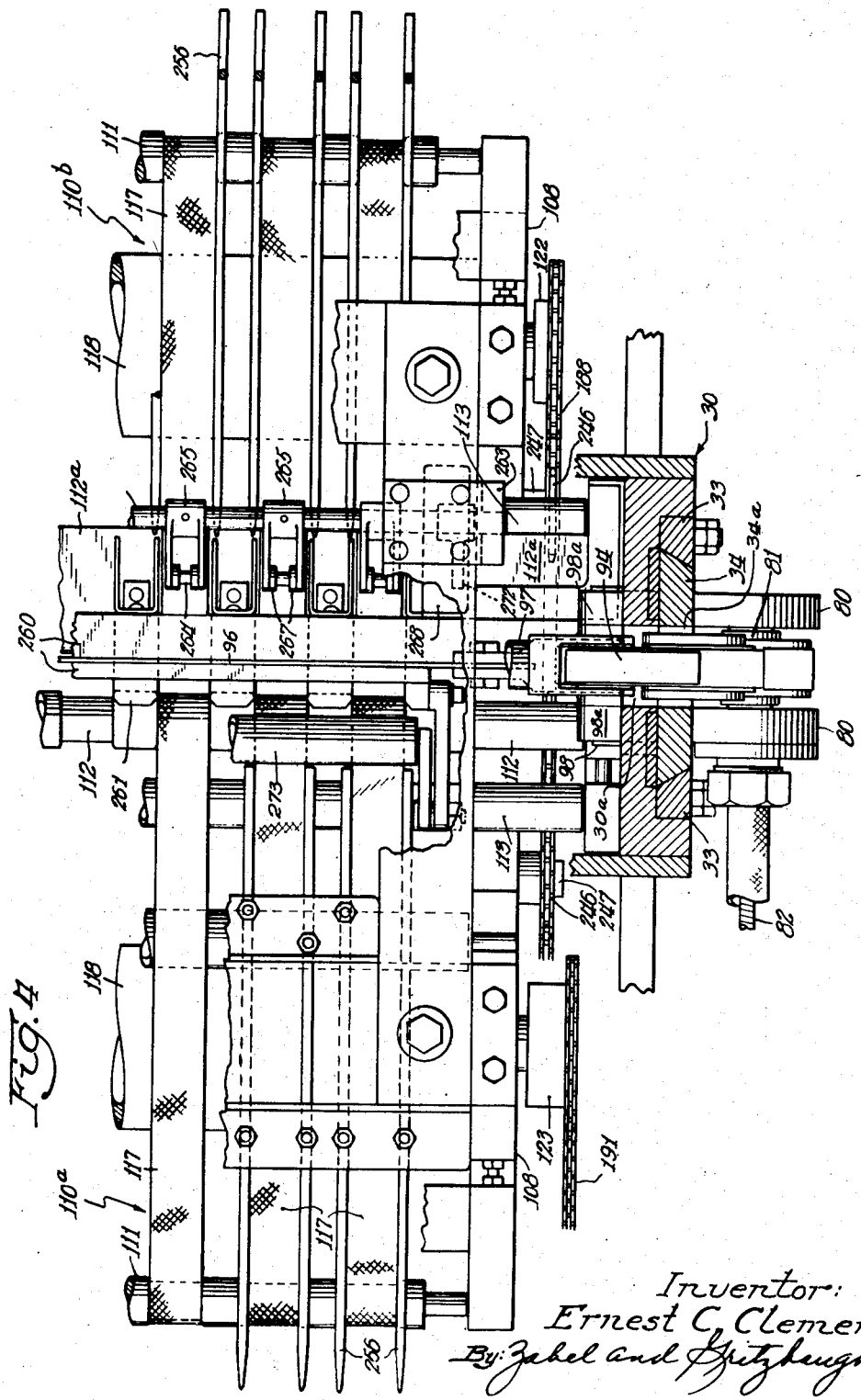
Fig. 4 is a horizontal sectional view taken along the line 4—4 of Fig. 1.
Figure 10:
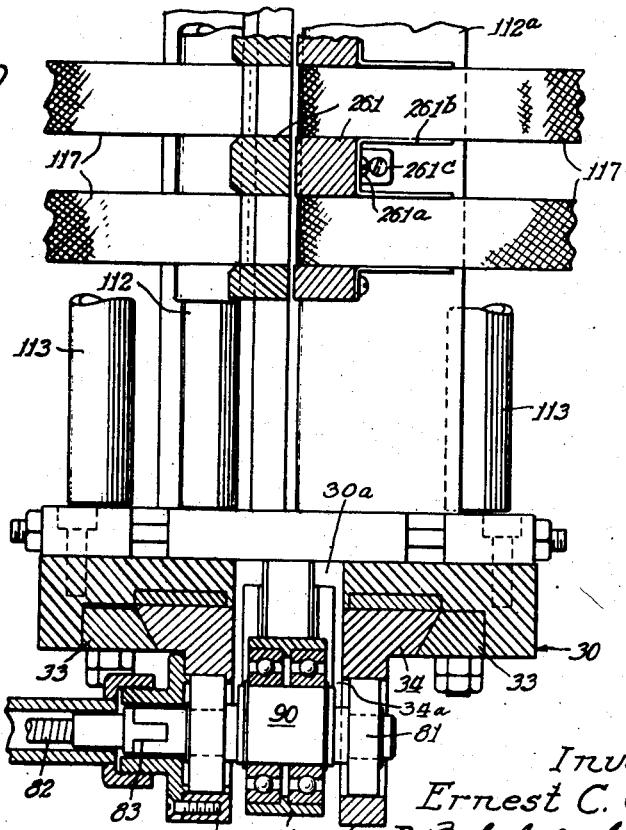
Fig. 10 is a horizontal sectional view through the device, the view being taken along the line 10—10 of Fig. 2.

Each leg 30 is provided with a vertical slot 30a (Figs. 4 and 10) extending substantially throughout its length. The outside face of legs 30 is recessed on either side of the slots 30a, as best shown in Figs. 4 and 10. At the upper and lower ends of each slot there are mounted spaced upper and spaced lower bearing members 33 (Figs. 1, 4 and 10), the individual bearing members being disposed in the leg recess and spaced somewhat from the slot edges. The sides of members 33 facing the slots are inclined, as shown in Figs. 4 and 10.

An elongated slidable plate 34 having a longitudinal slot 34a (Figs. 1, 4 and 10) therein has its ends respectively mounted between upper and lower bearing members 33. The plate sides at the ends thereof are inclined, as shown in Figs. 4 and 10, to cooperate with the inclined sides of the bearing members, whereby the plates are maintained in position with respect to the legs 30. Plates 34, as will be seen, reciprocate vertically when the equipment is in operation. A lug 35 (Fig. 1) is mounted on the lower end of each plate 34.

Figure 3:
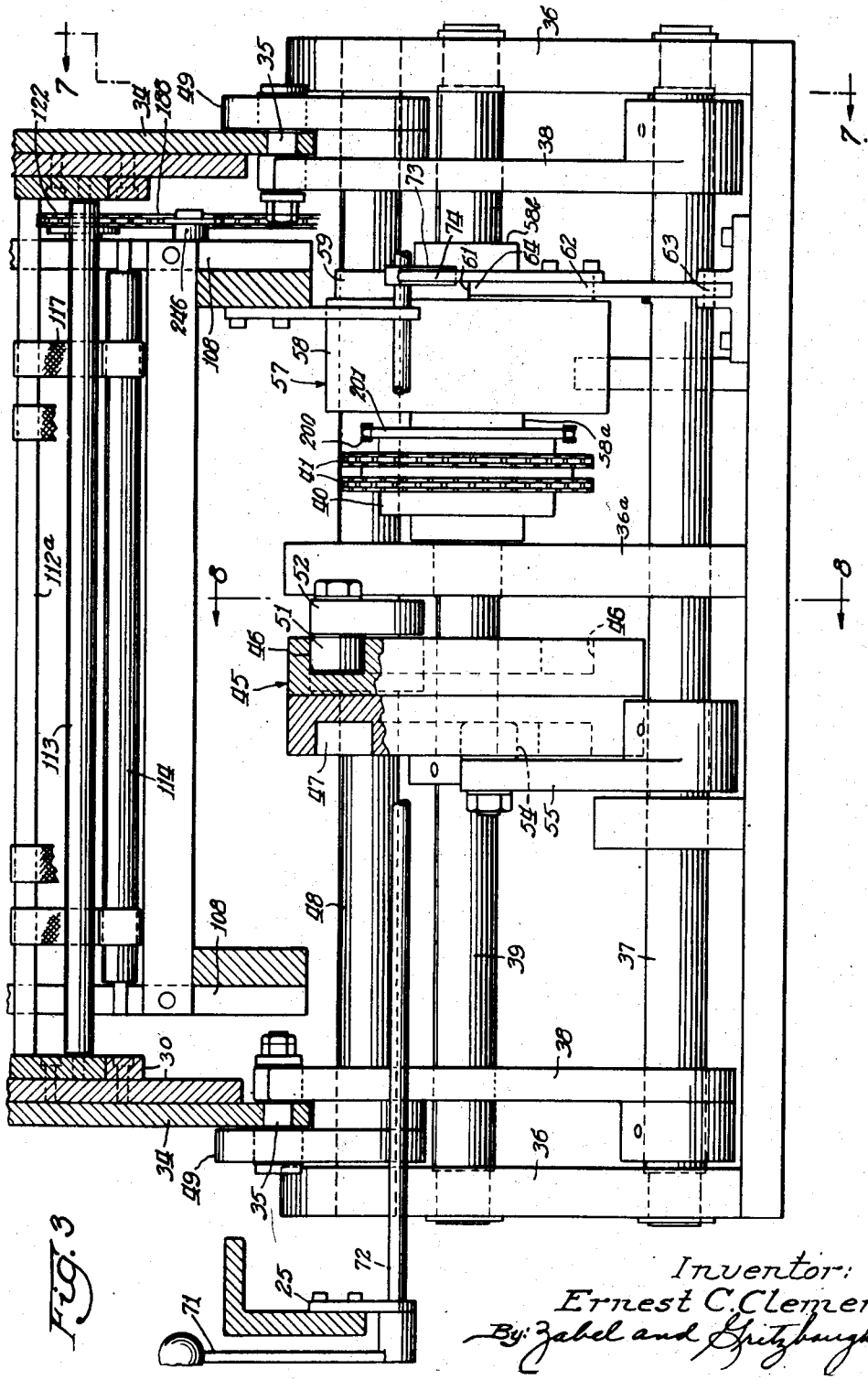
Fig. 3 is a vertical transverse sectional view taken through the lower portion of the device, the view being taken on the line 3—3 of Fig. 1.

An upstanding bearing member 36 (see Figs. 1 and 3) is disposed at each side of the frame 25 and a shaft 37 is journalled at its opposite ends in these spaced bearing members 36. As best shown in Figs. 3 and 7, there is an intermediate bearing member 36a disposed midway between the members 36. An arm 38 on each side of the machine is keyed (Fig. 7) at its lower end on the shaft 37 and is bifurcated on its upper end so as to receive the lug 35 between its bifurcations.

Also journalled in the spaced upright bearing members 36 is a shaft 39 (see Figs. 1 and 3) on which is loosely mounted a double drive sprocket wheel 40 (see Figs. 1, 3 and 7) about which operates a pair of sprocket chains 41 that are powered from a suitable motor (not shown). Gear reduction facilities may be provided in this motor drive if desired, and as shown in Figs. 1 and 7 in order to take up and adjust the slack in the sprocket chains 41 a double idler pulley 42 may be provided, the adjustment being made possible by movement of a plate 43 upon which the idler pulley 42 is mounted, the plate being pivoted on intermediate bearing member 36a. This movement is effected between a slot 44 and suitable locking means (shown in Fig. 7) cooperating with the slot.

As best shown in Figs. 3 and 8 a double cam member 45 is mounted on the shaft 39 and is fixed to the shaft so as to rotate therewith. The cam member is provided with a cam track 46 in one face thereof that serves to transform rotary motion of the shaft 39 into vertical reciprocating motion of the sliding plates 34 in a manner to be presently described. The other face of the cam member 45 is provided with a cam track 47 that transforms rotary motion of the shaft 39 into reciprocating motion of the U-shape frame 29 in a manner also to be presently described.

Again referring to Fig. 1 a shaft 48 is journalled in the spaced upright bearing members 36 and mounted on this shaft adjacent each end thereof is an arm 49 that at one end is keyed or otherwise fixed to the shaft. The other end of each arm 49 is provided with an elongated slot 49a in which the lug 35 on the bottom of the plate 34 is adapted to slidingly fit.

Referring now to Fig. 8 the cam track 46 in the cam member 45 is formed by and between a central cammed boss 50 and a marginal flange 50a that is spaced from the cammed boss 50. A cam follower 51 rides in the cam track 46 and this cam follower is mounted on the end of an arm 52 that is keyed as at 53 to the shaft 48. Thus as the cam member 45 rotates the cam follower 51 riding in the cam track 46 transmits backward and forward rotary motion to the shaft 48. Referring now to Fig. 1 this backward and forward rotary motion of the shaft 48 transmits similar rotational reciprocating movement to the arm 49 so as to raise and lower the corresponding sliding plate 34 on each leg 30 of the U-shape frame 29.

Again referring to Fig. 8 the cam track 47 on the opposite face of the cam member 45 is provided with a follower 54 that rides in the track. This cam follower 54 is mounted on the end of an arm 55 that is mounted on the shaft 37 at its opposite end and is keyed or otherwise secured to the shaft indicated at 56. Thus as the shaft 39 rotates the motion of the follower 54 is transmitted to the shaft 37 in the form of back and forth rocking motion. Referring to Fig. 1 this movement of shaft 37 is conveyed by the arm 38 to the lug 35 thereby transmitting horizontal reciprocating movement to the U-shape frame 29. The significance of the angles 108° and 252° appearing in Fig. 8 will be explained later.

Referring now to Figs. 3 and 7 an over-riding clutch 57 is mounted on the shaft 39, the clutch being adapted to transmit rotary motion of the drive sprocket 40 to the shaft 39. This clutch 57 may be a conventional over-riding clutch and for purposes of illustration comprises a driving clutch member 58 that is powered directly through connection 58a (Fig. 3) by the sprocket wheel 40 and a concentric driven clutch member (not shown) that is located inside the member 58 and is keyed or otherwise secured to the shaft 39. The protruding end of the inner driven clutch member is shown at 58b in Figs. 3 and 7. An over-riding type clutch is provided so that machine operation easily may be stopped, as is necessary from time to time in maintaining proper coordination with other components of the production line, or in emergencies.

Conventional one-way clutch rollers (not shown) are disposed between driving clutch member 58 and the driven clutch member, and they are carried in a cage that has an external annular flange 59 (Fig. 3). The periphery of flange 59 is cammed (best shown in Fig. 7) as indicated at 60 so to to provide a stop or shoulder 61. An arm 62 pivoted at its lower end at 63 to a part of the frame 25 is provided at its upper end with a follower 64. Thus as the shaft 39 rotates in the direction of the arrow indicated at 65 the follower 64, if riding along the cammed peripheral surface of the driven clutch member 59, engages the shoulder or stop 61 so as to stop the rotation of the cage carrying the clutch rollers, thereby releasing the clutch and stopping rotation of the driven member. A tension spring 66 spring biases the arm 62 to a position against the cammed surface of the driven clutch member 59.

An operating handle 71 is keyed to a shaft 72 mounted on the frame 25 as best shown at the left hand side of Fig. 3. Shaft 72 is provided with a foot 73 that is fixed adjacent to an arm 74 (Fig. 7) carried on pivoted arm 62. This operating handle 71 is adapted to be rotated back and forth, thereby rotating its shaft 72 so as to similarly rotate the foot 73. This foot 73 engages the arm 74 so that when the operating handle 71 is rotated in a clockwise direction the foot 73 engages arm 74 so as to move pivoted arm 62 in a counterclockwise direction about its pivot point 63 thereby withdrawing the cam follower head 64 out of contact with the shoulder or stop 61. This releases the clutch cage and effects a driving relation of the clutch parts. Thus the shaft 39 is driven through clutch 57 by the drive sprocket 40, and the U-shape frame 29 is reciprocated back and forth while at the same time the sliding plates 34 are vertically reciprocated. To stop this operation, handle 71 is returned to the position shown in Fig. 7 so that follower 64 of arm 62 may engage shoulder 61 on the driven clutch member 59. Shoulder 61 is so located on flange 59 that release of clutch 57 occurs at the proper point in the machine cycle, namely when the cutting knives (presently to be described) are at their uppermost position.

Mounted on one of the vertical sliding plates 34 is a pair of spaced bearing members 80 (Figs. 1, 4 and 10) in which is journalled a shaft 81. To this shaft 81 is suitably connected a flexible shaft 82 that is keyed as at 83 (see Fig. 10) to the shaft. This flexible shaft 82 is connected through a conventional gear box 84 (see Fig. 1) to a power shaft 85 that is driven by belts 86 through pulleys 87. The belts 86 operate over pulleys 88 on the end of a suitable driving motor 89.

Figure 2:
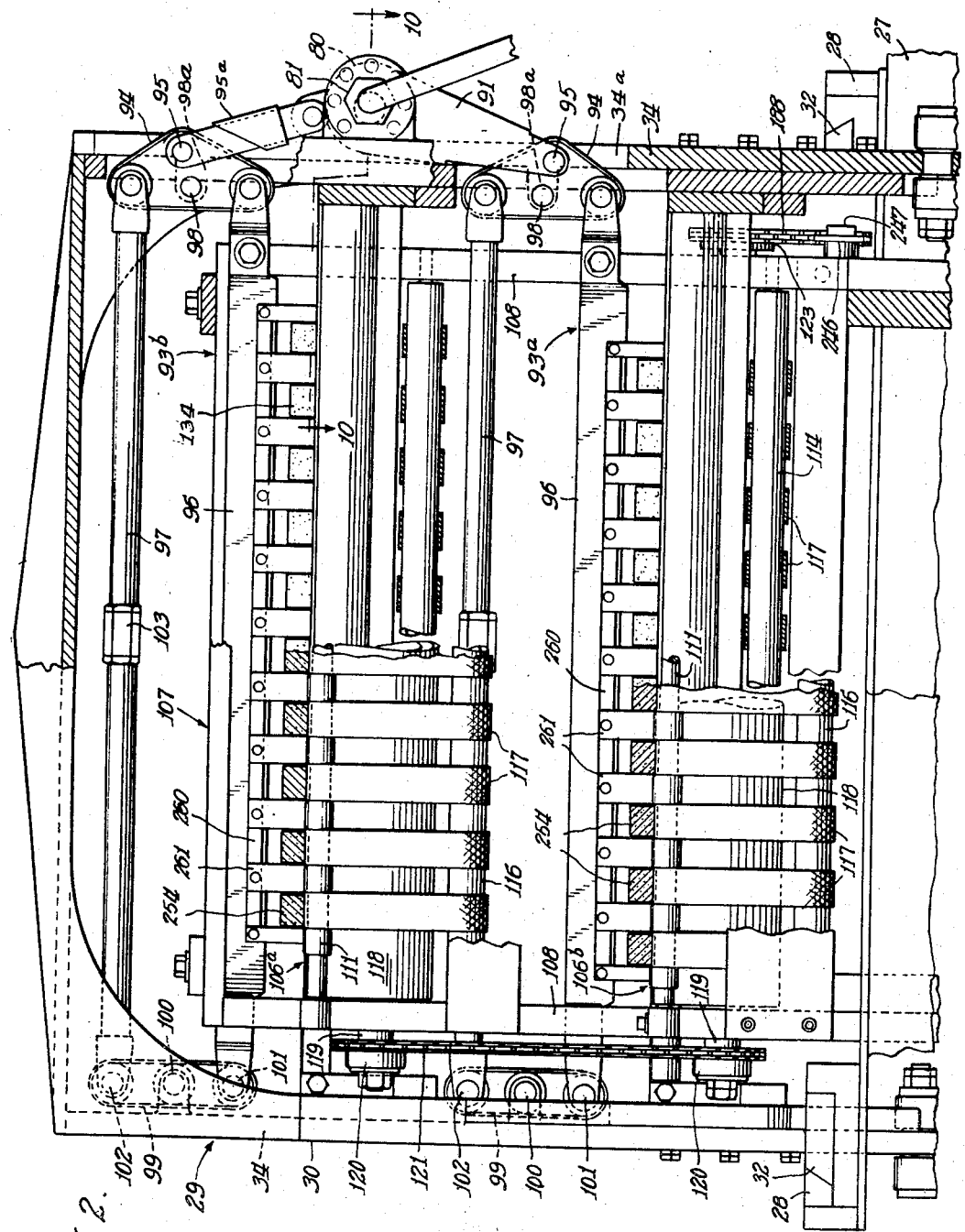
Fig. 2 is a vertical transverse sectional view through the upper portion of the device, the view being taken on the line 2—2 of Fig. 1.

Again referring to Figs. 1, 4 and 10 the shaft 81 is provided with an eccentric portion 90 (Fig. 10) upon which is mounted a bell crank 91 (see Fig. 2). Lower and upper knife assemblies 93a and 93b (Fig. 2) respectively are provided at the opposite ends of the bell crank 91, rocker arms 94 serving to connect each knife assembly to the corresponding end of the bell crank 91. Each of these rocker arms 94 is more or less triangular in shape, and the lower arm 94 is pivotally mounted at its apex as at 95 to the lower end of the bell crank 91. The upper triangular rocker arm 94 has its apex pivotally connected as at 95 to one end of a link 95a, the other end of the link being pivotally connected to the upper end of bell crank 91. Link 95a (Fig. 2) includes a sleeve having an inclined upper end. This sleeve is non-functional as far as the present invention is concerned.

At the lower corner of each triangular rocker arm 94 is mounted a knife blade 96 and at the upper corner of each rocker arm 94 is a connecting rod 97 that is pivotally secured to the rocker arm. Each of the rocker arms 94 is pivotally mounted on a shaft 98 that is carried by spaced lugs 98a (Figs. 2 and 4) extending from sliding plate 34.

At the opposite side of the device is a link 99 that is disposed opposite each rocker arm 94 and each of such links 99 is pivoted at its center as indicated at 100 to the adjacent plate 34. To the lower end of the link 99 is pivotally attached as at 101 the free end of the adjacent knife blade 96 and to the upper end of the link 99 is pivotally attached as at 102 the free end of the adjacent connecting rod 97.

Upon rotation of the shaft 81 (Figs. 2 and 10) the eccentrically mounted bell crank 91 is caused to move up and down so as to rock the upper and lower rocker arms 94 about their respective pivot points. This motion of the rocker arms 94 transmits horizontal oscillating motion to the knife blades 96. As best shown in Fig. 2 the connecting rods 97 may be split and provided with a take-up mechanism indicated at 103 for adjusting the tension in each of the knife blades 96.

Thus there is provided a U-frame 29 (Fig. 1) that is powered to reciprocate back and forth in a horizontal direction longitudinally of the device, and this frame 29 is provided with vertical moving plates 34 that are reciprocated in a vertical direction simultaneously with the horizontal movement of the U-frame 29. The plates 34 in turn support two knife assemblies that are disposed crosswise of the machine and are spaced one above the other. These assemblies include knives that are reciprocated in a horizontal transverse direction with respect to the slicing device. It is to be noted that the reciprocation of the knives is brought about by the motor 89 that is separate from the power drive to the U-frame 29 and plates 34.

Mounted on the frame 25 so as to be straddled by the U-frame 29 is a bar conveying assembly 105 (Fig. 1) that provides upper and lower candy slicing levels or platforms generally indicated in Figs. 1 and 2 at 106a and 106b respectively. These slicing levels 106a and 106b are identical and for that reason one only will be described in sufficient detail to understand the present invention.

The function of the candy bar conveying assembly is to convey to the slicing levels or platforms the continuous strips or ribbons of candy, to pass these strips under the slicer knives and then to convey the sliced bars in properly spaced relationship away from the knives.

Figure 5:
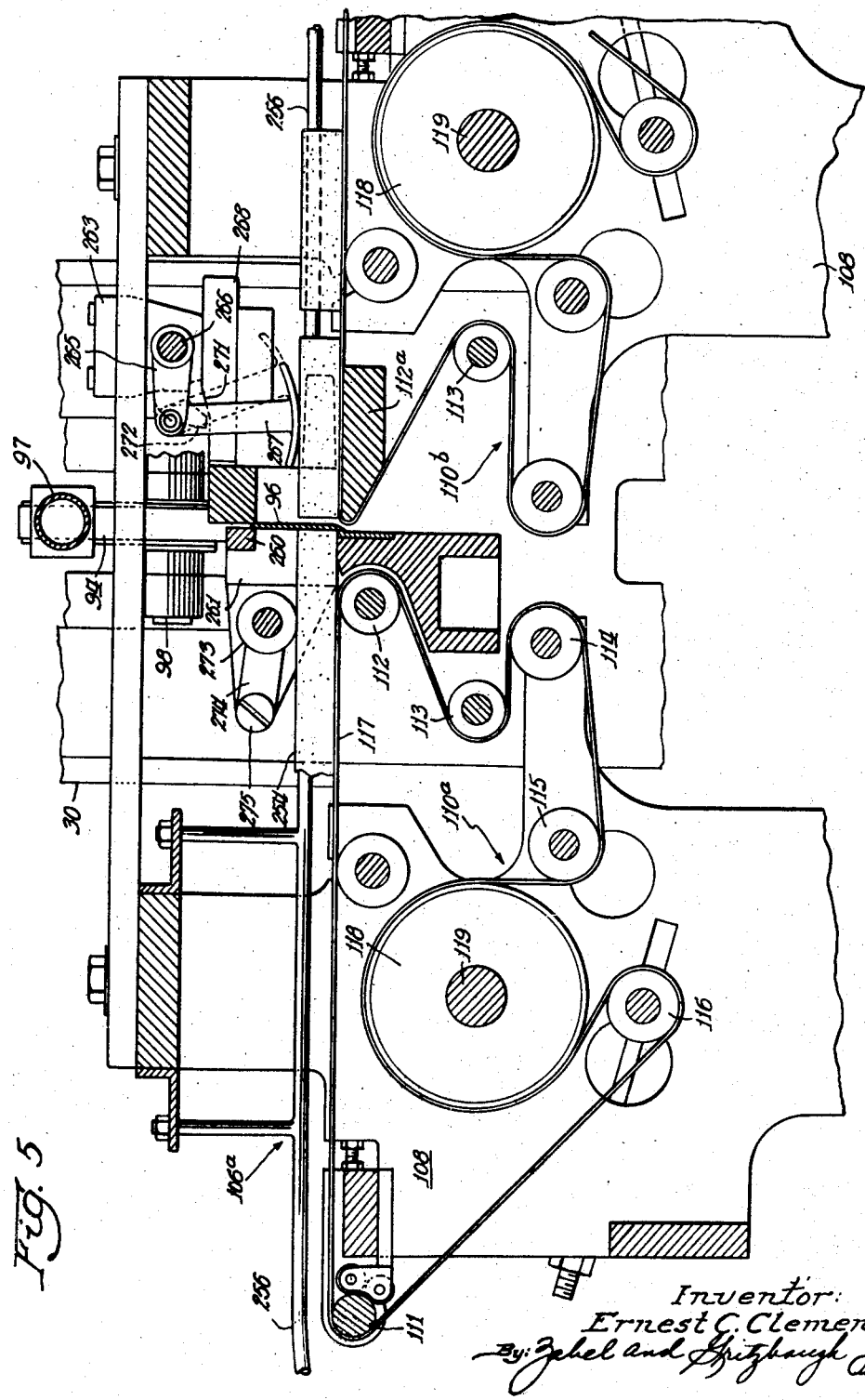
Fig. 5 is a vertical, longitudinal sectional view taken through the upper portion of the slicer shown in Fig. 1, the view being taken substantially along the longitudinal center line of the device.

The candy bar conveying assembly 105 comprises a stationary frame generally indicated at 107 that includes spaced side frame members 108 (Fig. 2) held together and stiffened by numerous cross braces. As indicated in Fig. 5 where only the upper slicing level 106a is shown the knife blade 96 is disposed transversely of the slicer, and the feed conveyor unit generally indicated at 110a is adapted to convey the candy strips into the region of the knife 96 and is substantially identical with the discharge conveyor unit generally indicated at 110b that conveys the sliced bars away from the knife blade 96. The same is also true with respect to the lower slicing level indicated at 106b in Fig. 6.

Figure 6:
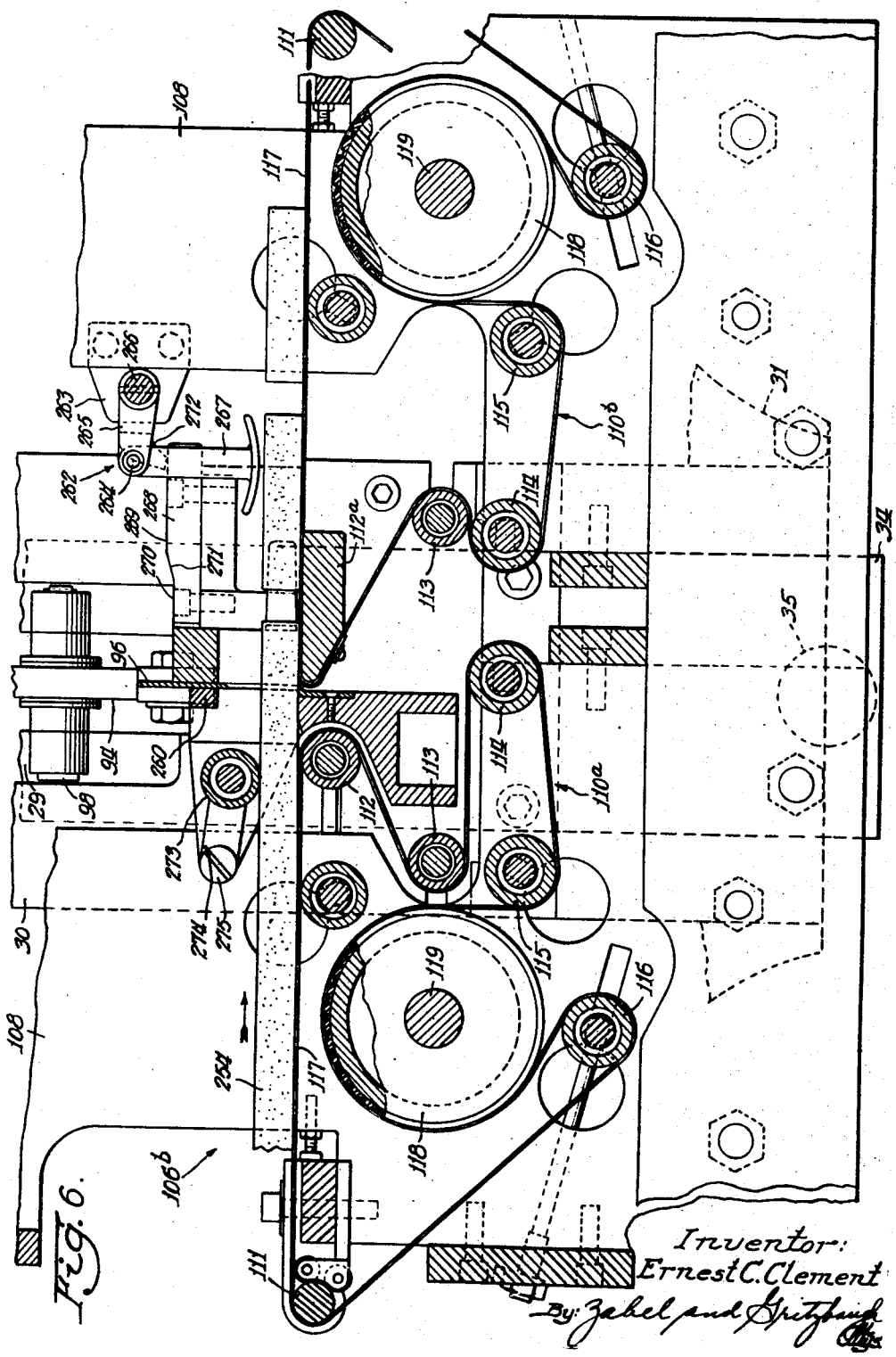
Fig. 6 is an enlarged, vertical longitudinal sectional view through the lower portion of the device shown in Fig. 1.

Each of such conveyor units on the input or feed side of the knives 96 comprises a pair of spaced rollers 111 and 112, the former being suitably journalled in the spaced side frame members 108 and the latter being suitably journalled in legs 30 (Fig. 10) of the movable inverted U-shape frame 29. A plurality of guide rollers 113, 114, 115 and 116 spaced as shown in Figs. 5 and 6 with respect to each other provide a circuitous path for a plurality of conveyor belts 117. Guide rollers 114, 115 and 116 are journalled in upright frame members 108, while roller 113 is journalled in legs 30 of the movable inverted U-shape frame 29. A power driven drum 118 is mounted on a shaft 119 that is journalled in the spaced upright frame members 108. The drum 118 is preferably provided with a rubberized treated peripheral surface so as to provide traction for the belts 117 that pass over the surface of this drum.

Referring to Figs. 5 and 6, as above mentioned the rollers 112 and 113 in each instance are journalled in the vertically disposed legs 30 of the U-frame 29 so that as the U-frame 29 moves back and forth the rollers 112 and 113 travel with the U-frame. The rollers 111, 114, 115 and 116 and the drum 118 on the other hand are mounted between the fixed side frame members 108 (see Fig. 2) so that the axes of these rollers in each instance are stationary. Thus the distance between the rollers 112 and 113 on the one hand and the remaining rollers and drum 118 on the other, varies during the movement of the U-frame 29. The conveyor belts 117 merely feed back and forth on the various rollers to compensate for this relative variation in spacing as between the two groups of rollers and no slack develops in conveyor belts 117. In other words, referring to Fig. 5, as roller 112 moves to the left with legs 30 toward fixed roller 111, the slack that would otherwise develop in the upper course of belts 117 is compensated for by a corresponding movement of roller 113 to the left away from fixed roller 114.

It is to be noted in Figs. 5 and 6, that in the case of the discharge conveyor unit 110b disposed to the right of the knife blades 96, a guide block 112a is employed instead of roller 112. This guide block 112a is carried by legs 30 (Fig. 3) and it serves the same purpose as the roller 112 but extends closer to the knife 96 than the roller 112 and hence provides better support for the cut candy bars. The remainder of discharge conveyor unit 110b is identical with feed conveyor 110a.

As shown in Fig. 2 each shaft 119 projects through one of the upright frame members 108 and has a sprocket wheel 120 fixed to the end thereof. A sprocket chain 121 operates about each pair of upper and lower sprocket wheels 120 that are mounted on each set of upper and lower drum shafts 119. Both lower shafts 119 project through the opposite upright frame member 108 and the shaft 119 disposed on the feed side of the lower slicer knife 96 (the left side of slicer knife 96 as viewed in Fig. 1) is provided with a sprocket wheel 123 while the shaft 119 disposed on the discharge side of the lower slicer knive 96 (the right side of the slicer knife as viewed in Fig. 1) is provided with a sprocket wheel 122. The power for driving both the lower and the upper conveyor units disposed on the feed side of the slicer knives 96 is transmitted to the corresponding lower shaft 119 through the sprocket wheel 123, while the power for driving the lower and upper conveyor units on the discharge side of the slicer knives 96 is transmitted to the corresponding lower shaft 119 through the sprocket wheel 122. This power for both of the sprocket wheels 122 and 123 is derived from a motor (not shown) that drives through a speed reducer 124 (see Fig. 1), which in turn powers a drive assembly generally indicated at 125. Speed reducer 124 thus constitutes the power source for the drive assembly and it will be referred to herein accordingly. This drive assembly 125 comprises a transmission unit generally indicated at 126 and an intermittent drive control unit generally indicated at 127.

The speed reducer 124 includes a drive shaft indicated at 128 that receives its power from the motor (not shown) through a chain and sprocket drive or other suitable drive connection and this shaft 128 in turn is suitably geared in a conventional manner to a driven shaft 129. Mounted on this driven shaft 129 is a sprocket wheel 129a about which is mounted a sprocket chain 130 that operates about another sprocket wheel 131a that is mounted about a shaft 131 located at the other end of the machine. The shaft 131 in turn is suitably journalled on the machine frame.

Also mounted on the shaft 131 is a sprocket wheel 132 that drives through a sprocket chain 133 a sprocket wheel 134 that is mounted on a shaft 135 of the transmission unit 126.

Figure 12:
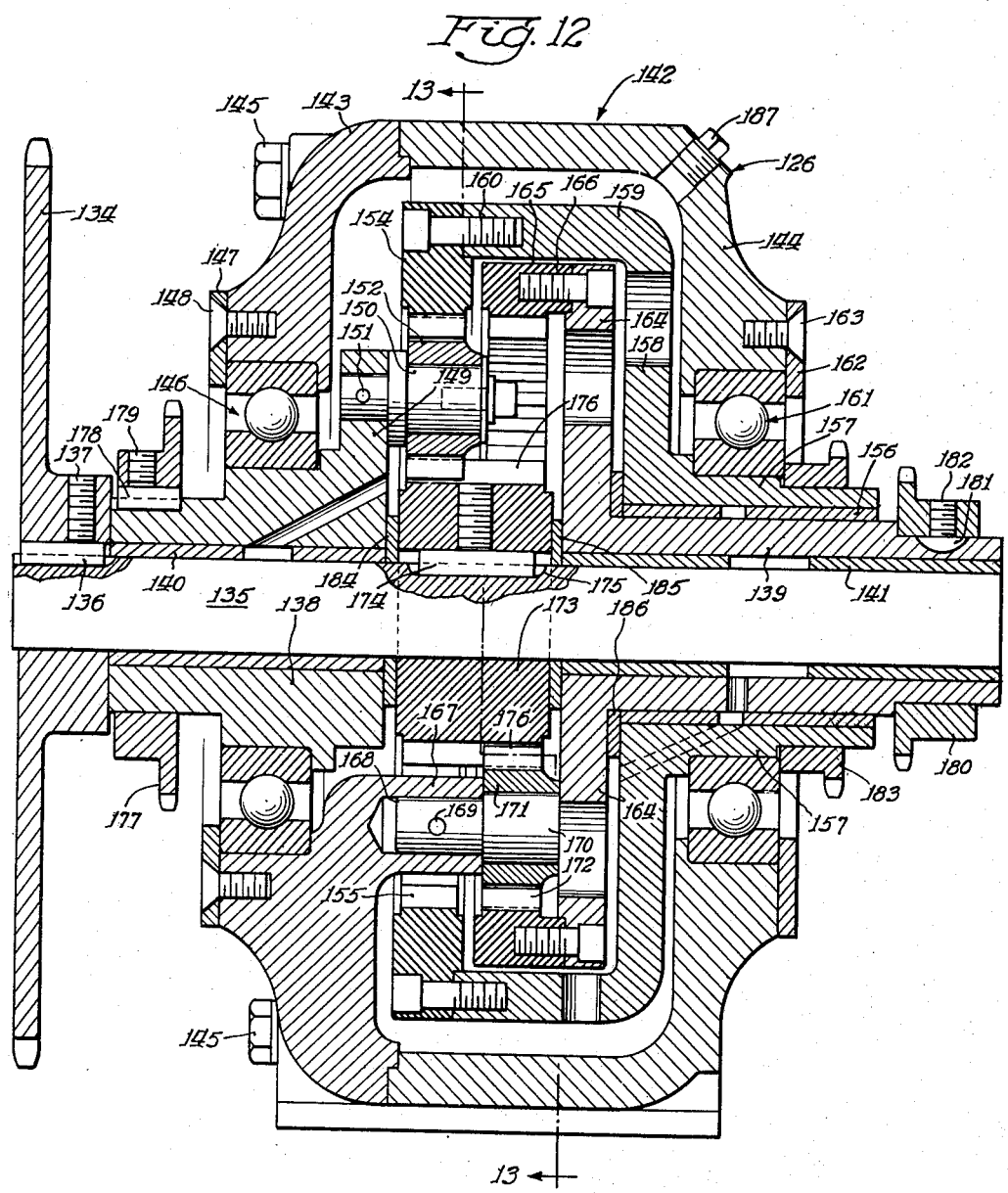
Fig. 12 is an enlarged, vertical sectional view taken through the transmission unit forming part of the drive assembly, the view being taken along the line 12—12 of Fig. 11.

Referring to Fig. 12 it can be seen that the sprocket wheel 134 is keyed as at 136 to the shaft 135 and this key is held in place by a set screw 137. Mounted about one end of the shaft 135 is a bushing 138 and about the other end of the shaft is a bushing 139. A sleeve 140 surrounds the shaft 135 between the bushing 138 and the shaft and another sleeve 141 surrounds the other end of the shaft 135 and is disposed between the shaft and the bushing 139.

The transmission unit 126 is provided with a housing generally indicated at 142 that comprises a rear housing member 143 and a forward housing member 144 screwed together by a plurality of screws 145. The rear bushing 138 is journalled in the rear housing member 143 by means of a ball bearing unit 146 that is annular in shape and is held in place by a rear plate 147 that is screwed as at 148 onto the rear housing member 143.

The bushing 138 is provided with ear-like flanges 149 (see Figs. 12 and 13) that are spaced 120 degrees apart and each of these ears is apertured to receive a stud 150 that is held in place by suitable means 151. This stud 150 serves as a shaft about which is rotatably mounted a planetary gear 152. The three gears 152 on the ears 149 of the bushing 138 form a movable planetary gear system hereinafter referred to by the reference character 153 whose function will be hereinafter described. Mounted concentrically about the planetary gear system 153 is a ring gear 154 that is provided with internal teeth 155 that are adapted to mesh with the teeth on the planetary gears 152 in the manner shown in Fig. 13.

Again referring to Fig. 12 the bushing 139 is surrounded by a sleeve 156 about which is concentrically mounted a sleeve 157 that is provided with a radially extending inner annular flange 158 on the end of which is a rearwardly extending annular flange 159. The free end of this flange 159 about its circumference engages the ring gear 154 and the two are rigidly screwed together by means of screws 160. Mounted between the sleeve 157 and the forward housing member 144 is a ball bearing unit 161 that is likewise annular in shape and is mounted concentrically about the cylindrical sleeve 157. A front plate 162 is screwed as at 163 onto the housing member 144 and holds the ball bearing unit 161 in place.

The bushing or sleeve 139 is provided at its inner end with a radially extending annular flange 164 and mounted against the inner face of this flange is a second ring gear 165 having the same internal diameter as the first ring gear 154. This second ring gear 165 is screwed as at 166 to the radially extending flange 164 of the sleeve 139.

Figure 13:
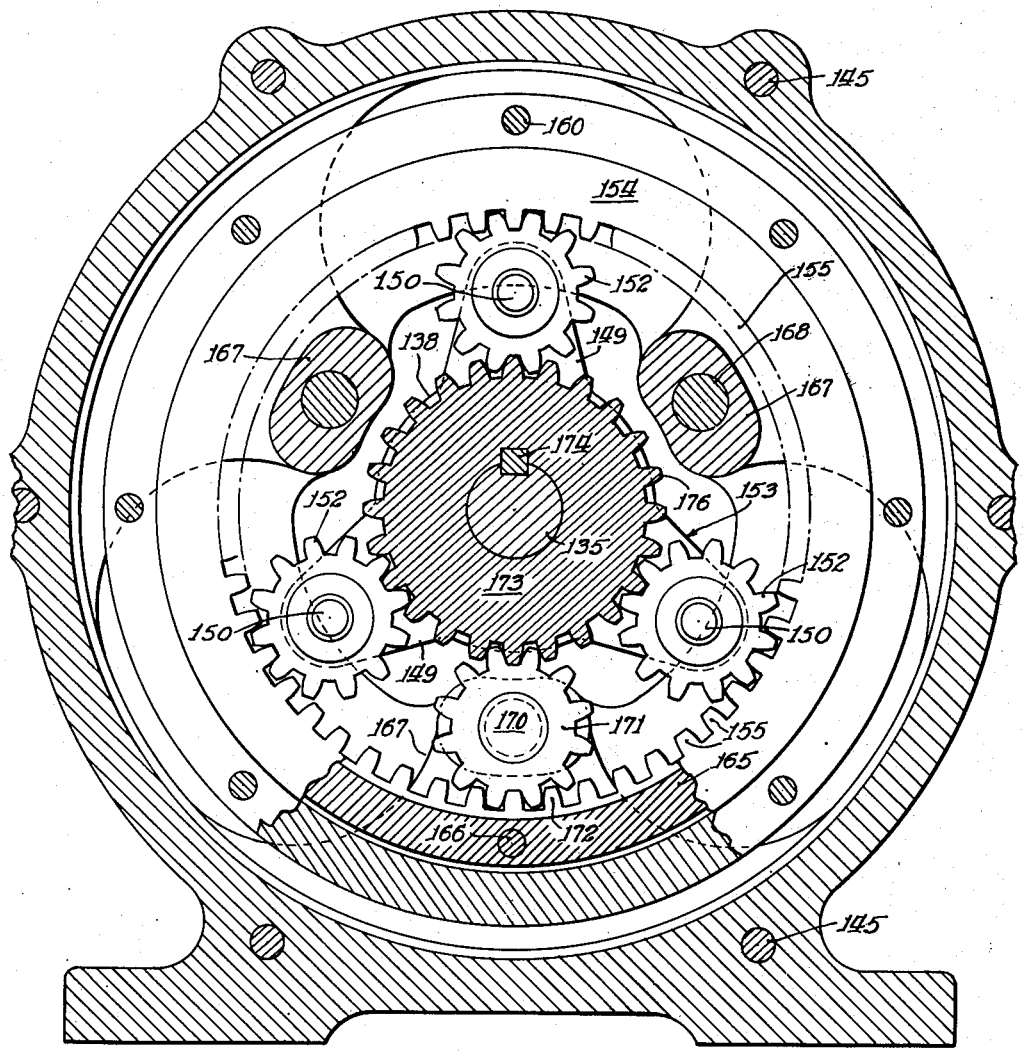
Fig. 13 is a vertical, sectional view through the transmission unit taken along the line 13—13 of Fig. 12.

As shown in Figs. 12 and 13 the rear housing member 143 is provided with three inwardly projecting stationary bosses 167 spaced at 120 degrees apart, and each of these bosses 167 is apertured to receive a stud 168. Each stud 168 is held in place by suitable means 169 and projects outwardly from boss 167 to provide a shaft 170 on which is mounted a stationary planetary gear 171. The stationary planetary gears 171 are fixed in their spaced relationship with respect to each other and will, therefore be referred to as the stationary planetary gear system. The planetary gears 171 of this stationary planetary gear system mesh with the internal teeth 172 of the second ring gear 165.

Approximately centrally located on the shaft 135 is a spur gear 173 (Figs. 12 and 13) that is mounted concentrically about the shaft and is keyed to the shaft by means of a key 174 that is held in keyway 175. This spur gear 173 is provided with gear teeth 176 that mesh with all of the movable planetary gears 152 and stationary planetary gears 171.

Again referring to Fig. 12 a sprocket wheel 177 is mounted concentrically about the bushing 138 and is keyed to the bushing as shown at 178. A set screw 179 is provided to hold the key 178 in fixed position.

At the front end of the transmission unit there is provided a sprocket wheel 180 that is concentrically mounted about the bushing 139 and this sprocket wheel is keyed to the bushing by means of a key 181 held in place by set screw 182. Concentrically mounted about the sleeve 157 is a sprocket wheel 183 that is fixed to this sleeve 157.

As best shown in Fig. 12 proper spaced relationship is maintained between the spur gear 173 and the adjoining bushing 138 by means of a ring 184 and similarly the proper spaced relationship between the other face of the spur gear 173 and the adjacent bushing 139 is maintained by spacer ring 185. Proper spaced relationship between the radial flange 164 of bushing 139 and radial flange 158 of the sleeve 157 is maintained by a spacer ring 186.

Suitable provisions are made for adequately oiling all the various bearings and bearing surfaces and for this purpose an oil inlet port may be provided in the casing with a threaded plug indicated at 187 adapted to close the opening.

As best shown in Fig. 1 a sprocket chain 188 is mounted about sprocket wheel 183 and this sprocket chain 188 travels over sprocket wheel 122 mounted on the lower shaft 119 that is disposed on the discharge side of the slicer knives 96 and then over idler sprockets 246 mounted on stud shafts 247 journalled in one of the side frames 108. Thus the power for operating this last mentioned shaft 119 is derived from the sprocket wheel 183 of the transmission unit 126. Similarly, a sprocket chain 191 is mounted about the sprocket wheel 180 and this sprocket chain 191 passes over an idler sprocket 192 mounted on one of the side frames 108 and then around the sprocket wheel 123 that is disposed on the lower shaft 119 located on the feed side of the slicer knives 96. Thus the power actuating this last mentioned lower shaft 119 is derived from the sprocket wheel 180 of the transmission unit 126.

Part of the drive for the transmission unit 126 is derived from shaft 131 through the sprocket chain 133 which in turn operates about the sprocket wheel 134 mounted on the end of shaft 135 (see Figs. 1, 11 and 12). Another portion of the drive for the transmission unit 126 is conveyed through the sprocket wheel 177 shown in Figs. 11 and 12 and this portion of the power is derived from the intermittent drive control unit 127 through a sprocket chain 193 that in turn is powered from a sprocket wheel 194 that forms part of the intermittent drive control unit 127.

This intermittent drive control unit 127 comprises generally a base 195 (see Fig. 14) on which is mounted a pair of spaced upright frame members 196 and 197. Journalled in the upright frame members 196 and 197 is a shaft 198, on one end of which is mounted a sprocket wheel 199. A sprocket chain 200 (see Figs. 11 and 14) passes over the sprocket wheel 199 and also operates about a sprocket wheel 201 (see Fig. 1) that is mounted on cam shaft 39. The sprocket wheel 199 (see Fig. 14) is held onto the end of the shaft by means of nuts 202. The sprocket chain 200 also operates about an idler sprocket 203 (Fig. 11) that is mounted on a stub shaft 204. This shaft 204 is secured to the upstanding frame member 197 and is adjustable in a vertically disposed slot 205 (see Fig. 11) so as to adjust the slack in the sprocket chain 200.

Also mounted on the shaft 198 is a cam 206 (see Figs. 11 and 14) that is provided with a cam track or surface shown at 207.

Disposed below the shaft 198 is a shaft 208 that is journalled in bearings 209 in the spaced upright frame members 196 and 197. Mounted on this shaft 208 is a bell crank lever 210 that is keyed as at 211 to the shaft. This bell crank lever 210 is provided with a pair of arms 210a and 210b. On the free end of the arm 210a is a cam follower 212 that is adapted to ride on the cam surface 207 of cam 206. The arm 210b is provided with an elongated slot 213 that extends inwardly from the free end of the arm and an end plate 214 (Fig. 15) closes the open end of this slot. This plate 214 is secured to the arm 210b by means of threaded screws 215 (see Fig. 15). Mounted in the slot 213 is a sliding block 216 that is adapted to slide from end to end in the slot 213. As best shown in Fig. 16 the sliding block 216 is grooved as at 217 in its top and bottom edges and the portions of the arm 210b forming the upper and lower walls of slot 213 are correspondingly provided with an elongated mortise-like rib 218 that fits into the corresponding groove 217 in the sliding block 216. As shown in Fig. 16 the sliding block 216 is provided with an outwardly projecting boss 219 that is surrounded by a sleeve 220. Mounted between the sleeve 220 and the boss 219 are roller bearings 221. A plate 222 is secured by means of a screw 223 onto the end of the boss 219 and this plate holds the sleeve 220 with the ball bearing assembly in place.

Again referring to Fig. 15 the sliding block 216 is apertured as at 224 and the bell crank lever 210 is apertured at 225 to receive an elongated bolt or shaft 226. This bolt 226 is provided with a knob or head 227 at one end which is held in place by a set screw 228 and is threaded adjacent to the other end as at 229 to match corresponding threads on the wall of the aperture 224. The threaded portion 229 of the bolt 226 projects through the sliding block 216 and on its free end is provided with a boss 230 that is adapted to be socketed in a bearing slot 231 formed in the end plate 214. Upon rotation of the knob 227 the bolt 226 rotates to move the movable block 216 along the threaded portion 229 of the bolt and hence lengthwise in the aperture 213. Thus the position of the sliding block 216 in the aperture 213 can be adjustably selected and when selected can be locked by means of a lock nut 232 that is threaded onto a threaded portion 233 adjacent to the knob 227 of bolt 226.

Referring to Figs. 11 and 17 a shaft 234 is journalled in ball bearing members 235 in the upright spaced frame members 196 and 197. This shaft projects through the upright frame member 197 and the sprocket wheel 194 is mounted on this projecting end of the shaft 234 and is keyed to the shaft by key 236. This sprocket wheel is held onto the shaft by means of a washer 238 and nuts 239. Also mounted on this shaft 234 between the spaced upright frame members 196 and 197 is a lever arm 240 that is keyed as at 241 in keyway 241a to the shaft. A set screw 243 holds the key 241 in place. This lever arm 240 as is best shown in Fig. 11 is elongated and is provided on its free end with an elongated slot 242. As best shown in Figs. 11 and 16 the free end of this lever arm 240 fits over the sleeve 220 on the boss 219, the sleeve 220 projecting into the elongated slot 242. The end plate 222 (Fig. 16) overlaps the outer faces of the lever arm 240 so as to hold the assembly together.

When the shaft 131 is driven from the motor (not shown) through speed reducer 124 (see Fig. 1) it places the drive assembly 125 into operation. As previously mentioned this drive assembly 125 drives through sprocket chains 188 and 191, the lower shafts 119, and the rotation of these shafts in turn rotates the upper shafts 119 so as to place into operation the conveyor units on both slicer levels 106a and 106b. When this is accomplished candy is being conveyed in a direction reading from left to right in Fig. 1. The manner in which the drive assembly 125 accomplishes this drive for the lower shafts 119 will now be described.

Referring first to Figs. 11 to 13 inclusive it will be noted that the rotation of shaft 131 drives sprocket wheel 134 through sprocket chain 133 to rotate shaft 135 of the transmission unit 126. This rotation of shaft 135 causes the spur gear 173 to rotate. The stationary planetary gears 171 are thereby rotated to transmit rotary motion to the ring gear 165. As shown in Fig. 12 ring gear 165 is fixed to the radial flange 164 of bushing 139 so that this bushing 139 rotates with the ring gear 165. Sprocket wheel 180 keyed to the bushing 139 is thereby rotated so as to drive through sprocket chain 191 and sprocket wheel 123 the lower shaft 119 that is disposed on the feed side of the slicer knife 96. This drive through the transmission unit 126 is always at a uniform speed so that the lower conveyor assembly on the feed side of the slicer knife whenever it is in operation moves at a uniform speed. This is also true with respect to the upper conveyor unit disposed on the feed side of the slicer knife on the upper level 106a since this upper conveyor is driven through sprocket chain 121 directly from the lower shaft 119.

Again referring to Figs. 12 and 13 it will be apparent that rotation of the spur gear 173 also drives the ring gear 154 through the movable planetary gears 152. This ring gear 154 in turn drives through screws 160, the bushing or sleeve 157 on which is mounted sprocket wheel 183. As previously mentioned in connection with Fig. 1 the rotation of the sprocket wheel 183 drives sprocket wheel 122 on the lower right hand shaft 119 through sprocket chain 188. This portion of the drive to the sprocket wheel 183 provides uniform rotation of the sprocket wheel but since the diameter of sprocket wheel 183 is greater than the diameter of sprocket wheel 180 (see Fig. 12) the velocity of sprocket chain 188 is faster than the velocity of the sprocket chain 191. Since it is desired under certain circumstances to have both the feed and the discharge conveyors at both levels 106a and 106b travel at the same velocity and to further provide for the acceleration of the conveyors on the discharge side of the knives a controlled adjustment is made on the drive for the sprocket 183. This controlled adjustment is provided by the intermittent drive control unit 127 (see Fig. 1) that drives sprocket wheel 177 (Fig. 11) to impart intermittent rocking motion to the movable planetary gear system 153 (Fig. 13) through bushing 138 (Fig. 12) that surrounds the shaft 135. The rocking motion of the planetary gear system 153 varies the otherwise uniform drive through the planetary gears 152 so as to vary the rotating speed of the ring gear 154 and hence the sprocket wheel 183.

Referring now to Fig. 11 it will be noted that the cam surface 207 on the cam 206 is provided with a gradually increasing radius of curvature through 252 degrees with a gradual decrease in curvature for the remaining 108 degrees. Let it be assumed that the direction of rotation of the cam 206 is indicated by the arrow D. From the position shown in Fig. 11, cam follower 212, for the first 252 degree portion of the complete revolution of the cam, is moved radially outward with respect to the axis of rotation of cam 206, thereby rocking the bell crank 210 about its shaft 208 in a counterclockwise direction as viewed in Fig. 11. This results in a clockwise rocking movement of shaft 234 which in turn imparts a clockwise rotation to the sprocket wheel 177. The rocking movement during this 252 degree portion of the cycle of cam 206 rocks the planetary gear system 153 at a relatively slow uniform velocity in a clockwise direction as viewed in Fig. 13 to effect a constant rotating speed of the ring gear 154 at a velocity less than the rotating sped of ring gear 165. This differential of rotating speeds of ring gears 154 and 165 produces the same differential in rotating speeds of sprockets 183 and 180 (Fig. 12) so as to produce the same linear velocities for the two sprocket chains 188 and 191 (Fig. 11). Thus during this 252 degree rotation of the cam 206 the conveyor units on both sides of the slicer knives are driven at the same velocity.

During the remaining 108 degrees of rotation of the cam 206, the cam follower 212 is moved radially inward with respect to the axis of rotation of cam 206 until it reaches the starting point where it is shown in Fig. 11. During this 108 degree portion of the cycle of the cam 206 the bell crank 210 is moved in a clockwise direction about its axis 208 so as to rotate shaft 234 in a counterclockwise direction. This counterclockwise direction of rotation is imparted to the sprocket wheel 177, which in turn rocks the planetary gear system 153 shown in Fig. 13 in a counterclockwise direction. This movement of the gears 152 in the planetary gear system 153 combined with the constant rotating force imparted through the planetary gears 152 by spur gear 173 effects an increased velocity of rotation of ring gear 154. During this period the ring gear 165 continues to operate at its uniform rotating speed and consequently the sprocket wheel 183 has now increased its speed of rotation with respect to the rotating speed of sprocket wheel 180. Thus during the 108 degree portion of the cycle of cam 206, the conveyor units disposed on the right hand or discharge side of the slicer knives, are moving at an increased velocity. This complete cycle repeats itself during continued rotation of the cam 206.

During the time the candy is being thus conveyed a motor drive through the drive sprocket chain 41 (see Figs. 1 and 7) places the U-frame 29 in horizontal reciprocating motion and also places the sliding plates 34 on each leg 30 of the U-frame 29 into vertical reciprocating motion. The knife blades 96 on both levels are then placed into operation by energizing the motor 89 (Fig. 1) so that the slicer then operates completely to convey the continuous strips of candy into the knife blades 96 where the blades cut the strips into bar lengths and then the bars are conveyed from the blades to the discharge end of the device.

Figure 9:
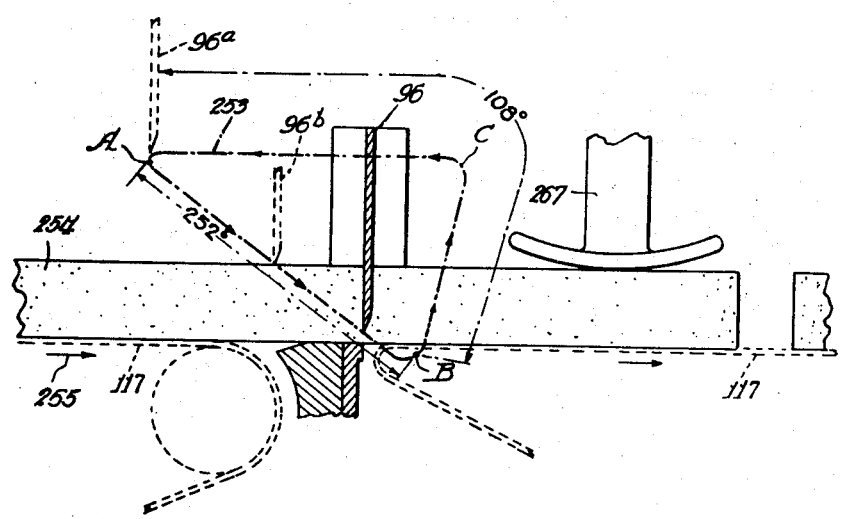
Fig. 9 is a more or less diagrammatic view illustrating the direction of travel of the cutting knives with respect to the movement of the candy during the cutting operation.

Referring now to Fig. 9 the net effect of these various motions of the U-frame and the sliding plates on each knife blade is diagrammatically indicated by the broken line 253. The strips of candy are indicated at 254 and these strips are being moved in the direction of the arrow 255 by the conveyor belts 117. In its uppermost position each knife blade 96 assumes the position shown at 96a in Fig. 9 well above the strips of candy that are being conveyed into the cutting region. As the U-frame 29 that supports each of the knife blades 96 moves from left to right at a speed corresponding to the advance movement of the candy strips 254 the knife blade 96 is moved downwardly to a position 96b where it engages the upper faces of the strips of candy. During the remainder of the travel of the U-frame the knife blade 96 passes downwardly through the candy strips 254 and since the U-frame 29 carrying each of the knife blades 96 is traveling exactly at the same rate of speed as the strips of candy 254 for the reason hereinafter explained, there is no relative horizontal movement therebetween. Thus the knife blade 96 passes vertically through the candy strips and at the end of the cutting operation the knife blade is lifted rapidly in a substantially vertical direction as indicated by the right hand portion of the broken lines 253 in Fig. 9. The blade is then returned to its initial raised position indicated at 96a and the operation is repeated.

Since the cam 206 is driven from the cam shaft 39 on which the cam unit 45 for the cycling of the slicing knives is mounted, this cam 206 is always synchronized with the operation of cam member 45. Referring to Fig. 8 the portion of the cam 47 within the 108 degrees corresponds with the portion of cam surface 207 within the same number of degrees marked on Fig. 11 so that during this 108 degree operation of cam 206, the slicer knife units operate through a path indicated by B, C and A in Fig. 9. During the period when cam follower 54 (Fig. 8) is operating over the surface of cam 47 indicated by the 252 degree marking, the cam follower 212 indicated in Fig. 11 is simultaneously operating over the 252 degree portion of cam surface 207. During this latter period the slicer knife 96 is moving downwardly and forwardly along the path indicated from A to B in Fig. 9.

Let it be assumed that the cycling speed of the slicing knives is at the rate of sixty cycles a minute for a bar length of say three inches. The conveyors on both slicer levels 106a and 106b will be travelling at a given speed to effect this bar length. Let it further be assumed that for these conditions the speed of operation for the variable speed sprocket 183 is proper throughout its cycle of operation. Under these conditions the shuttle cam shaft 39 is cycling at the rate of sixty cycles a minute and since the shaft 198 on the intermittent drive control unit 127 receives its rotating power from the shuttle cam shaft 39, this shaft 198 also cycles at the speed of sixty cycles a minute. When it is desired to adjust the slicing machine to slice candy bars at different lengths, one adjustment that must be made is to speed up or slow down the normal operating speed of the conveyor units on both slicer levels 106a and 106b so as to feed more or less candy into the slicer knives. For purposes of illustration let it be assumed that it is desired to increase the length of the bars that are to be sliced. For this purpose the speed of the conveyors will be increased so as to move the greater length of candy strips under the knives for each cut. Since the candy strips will now be moving at a greater velocity, it will also be necessary to increase the velocity of the slicer knives in their movement during the cutting stroke, though the actual cycling of the slicer knives remains at sixty cycles a minute. In order to accomplish this it is necessary to change the appropriate cam in the cam unit 45 (Figs. 3 and 8).

The increase in normal velocity of the conveyor units is effected by increasing the driving speed to the shaft 131 so as to effect an increase in the rotating speed of the spur gear 173 of the transmission unit 126. This increase in rotating speed of the spur gear 173 is imparted through ring gear 165 (Fig. 12) so that the output from the sprocket wheel 180 now corresponds to an increased uniform rotating speed to effect the new increased normal velocity for the conveyors.

As previously explained the rotating speed of the sprocket wheel 183 will be the resultant of the new uniform rotating speed of the spur gear 173 that is transmitted through the movable planetary gears 152 and ring gear 154, and the variable speed effected by the oscillation of the planetary system 153 provided through the intermittent control unit 127. Since the rotating speed of the spur gear 173 has now been increased the resultant rotating speed of the sprocket wheel 183 will no longer be in proper relationship with the now increased speed of the sprocket wheel 180. It is, therefore, necessary to adjust the limits of the oscillation of the planetary gear system 153 by increasing the stroke of the planetary gear system in order to again produce the proper relationship and rotating speeds between sprocket wheels 183 and 180.

This increased stroke is brought about by manipulating the knob 227 so as to move the sliding block 216 to the right (see Fig. 15) in slot 213 so as to increase the effective length of arm 210b of bell crank lever 210 (see also Fig. 11). This adjustment increases the throw of the shaft 234 and hence the planetary gear system 153. The amount of this increased throw in the shaft will be sufficient to bring the linear velocity of the sprocket chain 188 that operates about sprocket wheel 183 during the 252 degree portion of the cycle of the cam 206 into synchronism with the linear velocity of the sprocket chain 191 that operates about the sprocket wheel 180.

To effect a reduction in the length of candy bars produced by the slicing machine an appropriate change must be made to retard the velocity of the conveyor and the velocity of the slicing knives on their cutting stroke and in this instance the effective length of arm 210b of bell crank lever 210 (see Fig. 11) on the intermittent drive control unit 127 is shortened by moving the sliding block 216 (see Fig. 15) to the left in slot 213.

As shown in Fig. 4 suitable guide bars 256 may be disposed relative to the conveyor belts so as to guide the candy strips and bars entering and leaving the slicer so as to prevent lateral displacement of the bars during their movement through the slicer.

As shown in Fig. 2 a guard bar 260 is disposed on each side of each of the knife blades 96 to properly guide the blades, and this bar carries a plurality of downwardly projecting spacer members 261 between which the strips of candy indicated at 254 pass. The spacers 261 each are screwed as at 261a (Fig. 10) to a channel member 261b which in turn is screwed as at 261c to the guide block 112a. Thus guard bars 260, spacer members 261 and channel members 261b shuttle back and forth with guide block 112a which in turn is carried by U-frame 29.

Referring to Fig. 6 a pressure device generally indicated at 262 is mounted by means of brackets 263 between the stationary side frame members 108. This pressure device includes a shaft 264 fixed in the free end of spaced arms 265 that are fixed to a rotatable shaft 266 in the brackets 263. Suspended from the shaft 264 are a plurality of pressure feet 267 that are free to rotate about the fixed shaft 264.

Projecting outwardly from the adjacent guard member 260 is a cam block 268 (Fig. 11) that is provided with an upper cam surface having an upper level 269 and a lower level 270 divided by an inclined surface 271. A cam follower 272 is fixed with respect to the arms 265 and is adapted to ride on the upper cam surface of the cam block 268. Thus as the U-frame indicated at 29 in Fig. 6 moves from left to right the fixed cam block 268 likewise moves under the cam follower 272. When the inclined surface 271 reaches the position of the stationary cam follower 272 the follower rides down this inclined surface to the lower surface 270, during which movement the arm 265 rotates about the center of shaft 266 so as to lower the pressure feet 267. These pressure feet 267 are so disposed that one is provided above each candy bar that is passing therebeneath and when the pressure feet are disposed in their lowermost position, that is, when the lower cam surface 270 is located beneath the cam follower 272, the pressure feet 267 are engaging and bearing down on the candy bars therebeneath. In this manner proper friction is provided between the candy bars and the conveyor belts therebelow so as to eliminate all possibility of slippage of the belts beneath the candy bars. Thus when the cutting operation has been completed, in which condition the pressure feet 267 are lowered onto the candy bars, the frictional engagement of the candy bars with the conveyor belts therebelow is assured so that the candy bars are rapidly moving away from the cutting knife.

A pressure roller 273 (Fig. 11) is provided on the strips of candy at the entrance side to the knife blade 96. This pressure roller is mounted on a pair of spaced arms 274 that are pivoted about suitable fulcrum points 275. Thus the weight of the roller 273 provides downward pressure on the strips of candy fed therebeneath so as to insure proper frictional engagement of the candy with the conveyor belts therebeneath so as to eliminate slippage of the belts with respect to the candy.

Proper take-up devices are shown for taking up slack in the various belts and chains but since they are conventional and form no part of the present invention a detailed description is believed unnecessary.

Operation

To operate the slicing machine thus described, the motor driving the speed reducer 124 (Fig. 1) is placed into operation, the motor driving cam shaft 39 through sprocket chain 41 is likewise placed into operation and motor 89 driving through the flexible shaft 82 is simultaneously placed into operation. The machine is now completely operating to function as follows:

The candy strips 254 (see Figs. 5 and 6) that are fed onto the feed conveyor belts 117 at both the upper and lower slicer levels 106a and 106b are moved by the moving feed belts 117 toward the reciprocating slicer knives 96, i. e., in the direction corresponding to left to right as viewed in Figs. 5 and 6. This movement of the candy strips is uniform in speed and during this movement the slicer knives 96 are reciprocating back and forth in a transverse direction with respect to the movement of the candy strips. These knives 96 are also cycling through the path indicated by the letter C in Fig. 9. These candy strips are fed under the slicer knife 96 at each level when the knife is in the raised position shown in Fig. 6 and the leading edge of the candy passes under the knife onto the discharge conveyor belt 117 that is likewise operating in the same direction as feed conveyor belt 117. During the period when the slicer knife 96 is moving through the path shown in Fig. 9 illustrated by BCA (also indicated by the numeral 108 degree), the discharge conveyor belts 117 are operating at their faster rate of travel previously described so that these belts during this period are actually travelling faster than the movement of the candy. When the slicer knives 96 reach the position indicated at A in Fig. 9 they commence their downward movement represented by the path A to B in Fig. 9 (also indicated by the numeral 252 degree) and during this portion of the movement of the slicer knife, the candy strips 254 continue to move at the original uniform speed. The discharge conveyor belts 117 on the discharge side of the slicer knife 96 at this time are also travelling at the velocity of the feed conveyor belts 117 and consequently at the same velocity as the candy strips 254 are travelling. During this downward movement of each slicer knife 96 the knife blade itself is likewise travelling in the same direction as the strips of candy 254 and at the same velocity. Under these conditions the knife blade 96 is forced through the candy strips 254 to complete its cut. The bar lengths thus severed from the candy strips 254 are at this time wholly supported on the discharge conveyor belts 117 and at the moment the slicer knife blade 96 reaches its lowermost position indicated by the letter B in Fig. 9 and commences its upward movement in the direction B to C, the conveyor belts 117 on the discharge side of the knife blade 96 are accelerated in the manner previously described so as to move the sliced bars rapidly away from the upward moving slicer knife 96 and to effect the spacing between sliced bars indicated in Fig. 6. The discharge belts 117 continue to operate at this increased velocity until the slicer knife 96 has returned to its position indicated in broken lines 96a (position A) in Fig. 9. The cycle is then repeated.

I claim:

1. The combination of a slicing platform, a knife disposed over the platform, means mounting the knife for movement of the knife through a substantially vertical triangular path over the platform including a horizontally slidable frame, and means mounting the knife for substantially vertical movement on the frame, a conveyor on one side of the knife mounted to move toward the knife, a second conveyor on the other side of the knife disposed closely adjacent to the end of the first conveyor and mounted to move away from the knife, the triangular path for the knife having an upwardly extending side substantially over the position where the two conveyors adjoin, a substantially horizontal side extending from the upper end of the first side in a direction opposite to the movement of the first conveyor, and a third side extending diagonally downwardly to connect the free ends of the first two sides, drive means connected to the first conveyor adapted to drive said conveyor at a uniform velocity, and drive means connected to the second conveyor adapted to drive the second conveyor at the speed of the first conveyor while the knife is traveling down the inclined side of its path and at a greater velocity when the knife is traveling through the other two sides of the triangular path, said second drive means including a transmission unit comprising a spur gear, a ring gear mounted concentrically about the spur gear, and a planetary gear system including a planetary gear between and meshed with the spur gear and the ring gear, means driving the spur gear, means connecting the ring gear in driving relationship with the second conveyor, and means synchronized with the position of the knife in its path of travel for rocking said planetary gear in an arcuate path concentric with said spur gear.

2. The combination of a slicing platform, a knife disposed over the platform, means mounting the knife for movement of the knife through a substantially vertical triangular path over the platform including a horizontally slidable frame, and means mounting the knife for substantially vertical movement on the frame, a conveyor on one side of the knife mounted to move toward the knife, a second conveyor on the other side of the knife disposed closely adjacent to the end of the first conveyor and mounted to move away from the knife, the triangular path for the knife having an upwardly extending side substantially over the position where the two conveyors adjoin, a substantially horizontal side extending from the upper end of the first side in a direction opposite to the movement of the first conveyor, and a third side extending diagonally downwardly to connect the free ends of the first two sides, drive means connected to the first conveyor adapted to drive said conveyor at a uniform velocity, and drive means connected to the second conveyor adapted to drive the second conveyor at the speed of the first conveyor while the knife is traveling down the inclined side of its path and at a greater velocity when the knife is traveling through the other two sides of the triangular path, said second drive means including a transmission unit comprising a spur gear, a ring gear mounted concentrically about the spur gear, and a planetary gear system including a planetary gear between and meshed with the spur gear and the ring gear, means driving the spur gear, means connecting the ring gear in driving relationship with the second conveyor, and means synchronized with the position of the knife in its path of travel for rocking said planetary gear in an arcuate path concentric with said spur gear, and means to vary the amount of rocking movement of the planetary gear.

3. The combination of a slicing platform, a knife disposed over the platform, means mounting the knife for movement of the knife through a substantially vertical triangular path over the platform including a horizontally slidable frame, and means mounting the knife for substantially vertical movement on the frame, a conveyor on one side of the knife mounted to move toward the knife, a second conveyor on the other side of the knife disposed closely adjacent to the end of the first conveyor and mounted to move away from the knife, the triangular path for the knife having an upwardly extending side substantially over the position where the two conveyors adjoin, a substantially horizontal side extending from the upper end of the first side in a direction opposite to the movement of the first conveyor, and a third side extending diagonally downwardly to connect the free ends of the first two sides, drive means connected to the first conveyor adapted to drive said conveyor at a uniform velocity, and drive means connected to the second conveyor adapted to drive the second conveyor at the speed of the first conveyor while the knife is traveling down the inclined side of its path and at a greater velocity when the knife is traveling through the other two sides of the triangular path, said second drive means including a transmission unit comprising a spur gear, a ring gear mounted concentrically about the spur gear, and a planetary gear system including a planetary gear between and meshed with the spur gear and the ring gear, means driving the spur gear, means connecting the ring gear in driving relationship with the second conveyor, and means synchronized with the position of the knife in its path of travel for rocking said planetary gear in an arcuate path concentric with said spur gear, said last means including an intermittent drive control unit having an operating cam synchronized with the movement of the knife and a cam follower operatively connected to rock the planetary gear.

4. The combination of a slicing platform, a knife disposed over the platform, means mounting the knife for movement of the knife through a substantially vertical triangular path over the platform including a horizontally slidable frame, and means mounting the knife for substantially vertical movement on the frame, a conveyor on one side of the knife mounted to move toward the knife, a second conveyor on the other side of the knife disposed closely adjacent to the end of the first conveyor and mounted to move away from the knife, the triangular path for the knife having an upwardly extending side substantially over the position where the two conveyors adjoin, a substantially horizontal side extending from the upper end of the first side in a direction opposite to the movement of the first conveyor, and a third side extending diagonally downwardly to connect the free ends of the first two sides, drive means connected to the first conveyor adapted to drive said conveyor at a uniform velocity, and drive means connected to the second conveyor adapted to drive the second conveyor at the speed of the first conveyor while the knife is traveling down the inclined side of its path and at a greater velocity when the knife is traveling through the other two sides of the triangular path, said second drive means including a transmission unit comprising a spur gear, a ring gear mounted concentrically about the spur gear, and a planetary gear system including a planetary gear between and meshed with the spur gear and the ring gear, means driving the spur gear, means connecting the ring gear in driving relationship with the second conveyor, and means synchronized with the position of the knife in its path of travel for rocking said planetary gear in an arcuate path concentric with said spur gear, said last means including an intermittent drive control unit having an operating cam synchronized with the movement of the knife, a cam follower operatively connected to rock the planetary gear and adjustment means controlling the amount of rock transmitted by the cam follower to the planetary gear.

ERNEST C. CLEMENT.

References Cited in the file of this patent

UNITED STATES PATENTS

| Number | Name | Date |
| --- | --- | --- |
| 1,976,855 | McKee | Oct. 16, 1934 |
| 2,073,082 | Walter | Mar. 9, 1937 |
| 2,112,443 | Martoccio | Mar. 29, 1938 |
| 2,151,693 | Flint | Mar. 28, 1939 |
| 2,276,545 | Olgiati | Mar. 17, 1942 |
| 2,301,543 | Hlavaty | Nov. 10, 1942 |
| 2,345,637 | Stiles | Apr. 4, 1944 |